(12) United States Patent
Balan

(10) Patent No.: US 10,710,726 B2
(45) Date of Patent: Jul. 14, 2020

(54) ANTI-TRAUMA APPARATUS FOR THE PROTECTION OF INHABITANTS IN A VOLUME OF A CRAFT AND METHOD OF INSTALLATION THEREOF

(71) Applicant: Alexandru Balan, Boca Raton, FL (US)

(72) Inventor: Alexandru Balan, Boca Raton, FL (US)

(73) Assignee: ALEXANDRU BALAN, Granite Falls, NC (US)

( * ) Notice: Subject to any disclaimer, the term of this patent is extended or adjusted under 35 U.S.C. 154(b) by 163 days.

(21) Appl. No.: 15/953,602

(22) Filed: Apr. 16, 2018

(65) Prior Publication Data

US 2019/0315469 A1 Oct. 17, 2019

(51) Int. Cl.
| | |
|---|---|
| *B64D 11/06* | (2006.01) |
| *B05B 9/047* | (2006.01) |
| *B05B 1/14* | (2006.01) |
| *B60R 21/00* | (2006.01) |
| *B60R 21/26* | (2011.01) |
| *A62C 31/12* | (2006.01) |

(52) U.S. Cl.
CPC .............. *B64D 11/062* (2014.12); *B05B 1/14* (2013.01); *B05B 9/047* (2013.01); *A62C 31/12* (2013.01); *B60R 2021/0093* (2013.01); *B60R 2021/26029* (2013.01)

(58) Field of Classification Search
CPC ......... B60R 21/02; B60R 21/00; B60R 16/08; A62C 3/065; A62C 3/07; A62C 3/08; A62C 31/12; A62C 13/22; A62C 13/68; A62C 13/70; A62C 35/023; A62C 35/08; B05B 9/047; B05B 1/14; B64D 11/062; B64D 11/0619; B64D 37/32
USPC .......................................... 280/748; 180/271
See application file for complete search history.

(56) References Cited

U.S. PATENT DOCUMENTS

| | | | | |
|---|---|---|---|---|
| 2,786,536 A | * | 3/1957 | Orsini ................... | A62C 13/22 169/6 |
| 2,834,606 A | * | 5/1958 | Bertrand ................ | B60R 21/20 280/730.1 |
| 3,309,109 A | * | 3/1967 | Baughman ............. | B60R 21/02 280/748 |
| 3,388,746 A | * | 6/1968 | Lindberg ................ | A62C 3/08 169/56 |
| 3,588,142 A | * | 6/1971 | Gorman ................ | B60R 19/205 280/736 |

(Continued)

FOREIGN PATENT DOCUMENTS

| | | | | |
|---|---|---|---|---|
| CA | 2518534 A1 | * | 10/2004 | ............... A62C 3/07 |
| DE | 19901811 A1 | * | 7/2000 | ............. B60R 21/26 |
| FR | 2706313 A1 | * | 12/1994 | ............... A62C 3/07 |

*Primary Examiner* — Ruth Ilan
(74) *Attorney, Agent, or Firm* — Vedder Price P.C.

(57) ABSTRACT

This invention relates to any field where crafts (such as avionics) where inhabitants of volumes like passage compartments can be found where the area is subject to extreme conditions such as explosion, fire or other traumatic activity linked with a crash, and more specifically a pressurized dual-compartment canister or anti-trauma apparatus for the storage, mixing, and blast-release of a neutralizing chemical compound within the environment of the volume in a craft placed adjacent to the volume for the blast release of a quickly expanding and quickly retracting product.

12 Claims, 14 Drawing Sheets

(56) References Cited

U.S. PATENT DOCUMENTS

| | | | | |
|---|---|---|---|---|
| 3,853,334 A * | 12/1974 | Auman | ................... | B60R 21/16 |
| | | | | 280/728.3 |
| 4,177,863 A * | 12/1979 | Simon | ....................... | A62C 3/06 |
| | | | | 169/62 |
| 4,531,607 A * | 7/1985 | Browne | .................. | B60R 21/00 |
| | | | | 180/282 |
| 4,541,947 A * | 9/1985 | Clark | ........................ | F41H 9/00 |
| | | | | 169/46 |
| 5,649,466 A * | 7/1997 | Genovese | .......... | B64D 45/0015 |
| | | | | 89/1.11 |
| 5,775,596 A * | 7/1998 | Whisman | ............... | A62C 31/12 |
| | | | | 169/15 |
| 6,244,625 B1 * | 6/2001 | Bayer | ..................... | B60R 19/22 |
| | | | | 280/748 |
| 6,334,490 B1 * | 1/2002 | Dille | ........................ | A62C 3/07 |
| | | | | 169/14 |
| 7,011,164 B1 * | 3/2006 | Breazeale | ............... | B60R 25/04 |
| | | | | 169/62 |
| 7,533,734 B2 * | 5/2009 | Fore | ........................ | A62C 5/02 |
| | | | | 169/44 |
| 7,896,121 B2 * | 3/2011 | Thompson | ............... | A62C 3/07 |
| | | | | 137/351 |
| 2007/0074877 A1 * | 4/2007 | Thompson | ............... | A62C 3/07 |
| | | | | 169/62 |
| 2014/0231105 A1 * | 8/2014 | Helasuo | ................. | A62C 37/09 |
| | | | | 169/46 |
| 2015/0075823 A1 * | 3/2015 | Meier | ...................... | A62C 3/08 |
| | | | | 169/46 |
| 2015/0258358 A1 * | 9/2015 | Popp | ........................ | A62C 3/08 |
| | | | | 169/46 |
| 2018/0221695 A1 * | 8/2018 | Shaw | ................... | A62C 35/023 |
| 2019/0299041 A1 * | 10/2019 | Teoldi | .................... | B05B 9/0844 |
| 2019/0315478 A1 * | 10/2019 | Balan | ....................... | A62C 3/08 |

\* cited by examiner (DETAIL A)

(DETAIL B)

(DETAIL C)

(DETAIL D)

ANTI-TRAUMA APPARATUS FOR THE PROTECTION OF INHABITANTS IN A VOLUME OF A CRAFT AND METHOD OF INSTALLATION THEREOF

FIELD OF THE INVENTION

This invention relates to any field where crafts (such as avionics) where inhabitants of volumes like passage compartments can be found where the area is subject to extreme conditions such as explosion, fire or other traumatic activity linked with a crash, and more specifically a pressurized dual-compartment canister or anti-trauma apparatus for the storage, mixing, and blast-release of a neutralizing chemical compound within the environment of the volume in a craft placed adjacent to the volume for the blast release of a quickly expanding and quickly retracting product.

BRIEF DESCRIPTION OF THE DRAWINGS

The features of the present disclosure are believed to be novel and are set forth with particularity in the appended claims. The disclosure may best be understood by reference to the following description taken in conjunction with the accompanying drawings, and the figures that employ like reference numerals identify like elements.

BACKGROUND

One of the key concerns in all industries with passengers or travelers is the safety of these individuals. For example, the airline industry can only offer its services as long as the protection of human lives, placed in a volume or a cabin is delivered at the point of destination safely. Trains, cars, boats, and all other types of crafts share the same concerns as to safety. In addition to the safety of passengers, some precautions taken to ensure safety also result in the protection of the craft itself from damage, shocks, or harm. The added and direct benefit of increased passenger safety is a higher confidence in the mode of transportation which results in greater use and increased market shares.

In the airline industry, passengers and crew board aircrafts which must transport large amounts of combustible fuel to travel long distances. The same is true of most long distance flights or even space travel flights. Safety takes on many aspects and can be implemented as part of these fields in many ways. For example, maintenance processes increase reliability of equipment. Quality control and strict adherence to protocols avoid the appearance of problematic conditions. Advances in the understanding and anticipation of weather patterns and other external environmental conditions also help increase safety. The current invention is linked with increased safety of crafts by using onboard active/passive systems designed to give a craft additional capabilities in case of the occurrence of unsafe conditions.

U.S. Pat. No. 7,081,153, of inventors Leigh et al. describes systems and methods of generating nitrogen enriched air for aircraft fuel at the tank level. Hopefully, such systems when powered allow for reducing the risk of fire and explosion from the fuel in case of a problem with the aircraft. Other known systems are linked with purposefully ejecting fuel from the craft before problematic landings to avoid explosion. But the manipulation and release of fuel is linked with extreme complexity and unpredictability. For example, engine fires may ignite fuel being released and nitrogen supplies may be imperfect in case where part of the tank is compromised. In addition, upon a crash landing, any system implemented at the tank level will no longer operate as the crash may completely alter conditions and dispensability of the combustible fuel.

Figure 1:
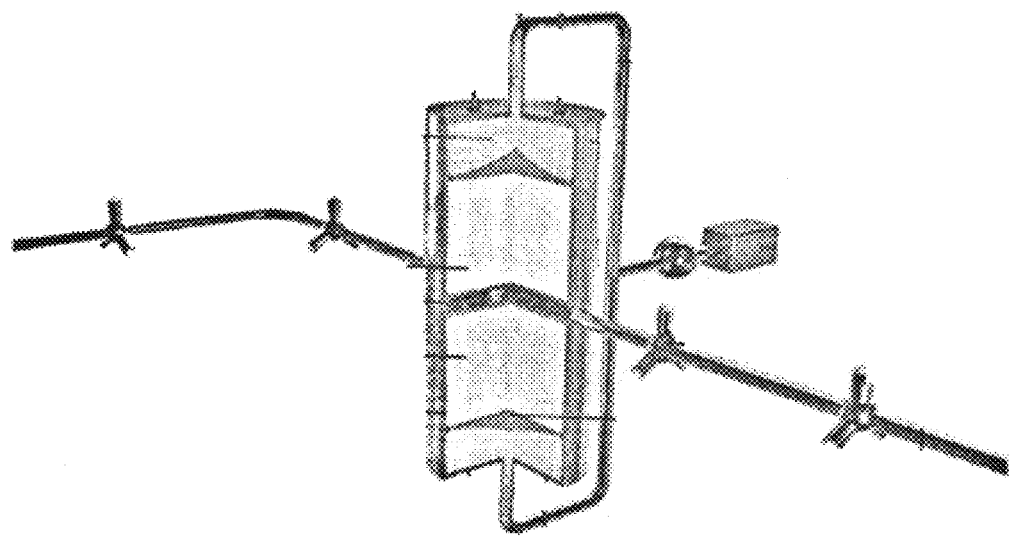
FIG. 1 is a view from a piece of prior art.

Author, Alexandru Balan, described how compressed liquid compounds made of a number of active chemicals such as perchloric acid, nitrogen, potassium, and other elements be used to address issues of neutralization of different environment. Anti-Explosion (SIAAB1-2013) and Anti-Trauma (SIAAB2-2013), Complex System of Passive Aviation Safety, Moldovian State Agency on IP, Reg. No. 3735, Date 9, Jul. 2013, IDNP: 2003033039049. FIG. 1 is one of the illustrations authored by Mr. Balan showing generally a device-like tank for storage and mixing of SIAAB1 chemicals. This figure illustrates generally a tank with internal membranes and mixture at a mid-point for pressurized release. This disclosure does not enable implementation or any working solution for use but only generally describes a principle of application.

In addition, different crafts have different modes of failure which in term create different risks upon passengers. For example, at one end of the spectrum low speed crafts like a cruise ship house passengers for days in reinforced metal cabins. While the risk of high-velocity impacts and explosions is lower, the risk of explosion and/or shock impacts is at its highest in space exploration crafts and rockets where the risk of explosion is quantified for each operation of the craft. In the center of this spectrum can be found automobiles, buses, airplanes, and motorcycles.

What is needed is single or multiple dimensional technology which can help replace or be added to existing safety protocols and systems to help further improve safety or security of passengers in a volume, at a reasonable cost, with a great level of certainty.

Finally, safety systems to be implemented must themselves not increase risk upon the passengers of any volume. For example, in aircraft aviation, certain inventions are designed to eject a passenger compartment from an airplane in default mode. Such a system requires installing inside the plane a set of explosives able to release a roof portion. In case of failure of the additional safety system, the roof of a fully functioning plane will be ejected creating a problem where none was present. The currently described safety system must be able to reduce overall risk without adding risk.

SUMMARY

This invention relates to any field where crafts (such as avionics) where inhabitants of volumes like passage compartments can be found where the area is subject to extreme conditions such as explosion, fire or other traumatic activity linked with a crash, and more specifically a pressurized dual-compartment canister or anti-trauma apparatus for the storage, mixing, and blast-release of a neutralizing chemical compound within the environment of the volume in a craft placed adjacent to the volume for the blast release of a quickly expanding and quickly retracting product.

DETAILED DESCRIPTION

The Fields of Use of the Technology

FIGS. 2-27 describe a system, method of use, and associated multi-dimensional apparatus system as implemented onboard of a commercial airplane. Since most people have first-hand knowledge of commercial aircrafts, describing such a system will help the reader's comprehension. In addition, for the moment the inventor has planned in initial stages of implementation of this technology, systems and apparatus specifically sized and adapted for this field of use. But the reader should not be misled into thinking the best mode of implementation and the optimal field is limited avionics.

As explained below, the different concepts and notions linked with these safety methods, systems, processes, and devices can easily be adapted in size, rapidity of use, and technology for use in multiple other industries where a need to protect equipment and/or human lives is found. For example, while part of the technology may not be adapted for implementation onboard a cruise ship because of its unlikeliness in facing high velocity, high heat and high impact explosive conditions, the technology could be perfectly adapted to save the lives of mechanics working in the engine room of these cruise ships.

One of ordinary skill in the art will recognize how the technology described herein may be adapted, changed, or modified both from a mechanical or configuration perspective to be used in other industries.

The Dual Concept of Trauma/Explosion

At the heart of the different devices, apparatus and systems invented herein is the concept that a new system addresses the notion that a volume (e.g. a passenger cabin) may face one or more environmental strains and stresses at the same time or in rapid succession and that unless all dimensions of the situation are handled, the passenger will not be brought to safety. On Jan. 28, 1986, the NASA shuttle orbiter mission STS-51-L and the Space Shuttle Challenger (OV-99) faced a dual dimensional situation. First, the main boosters exploded because of joint failure creating a shock wave on the Shuttle. Then, in a matter of minutes, the passenger cabin ejected by the shock wave fell without protection and impacted water at high velocity. For the crew to have had even a possibility to be saved from this situation, a system must have addressed (a) the exposition of the booster, and (b) one or multiple impacts of the cabin at return. In aviation, the problem is identical in that planes that may have failures at high altitude must land or face a crash. As one can imagine, the failure mechanisms linked with these extraordinary events is rather difficult to model and anticipate. The current invention uses a dual-step approach to allow for greater adaptability.

The first step is called an "anti-explosion" mechanism, aka the X1, and is a pressurized canister filled with an active solution named the S1 designed to be blast diffused within an explosive fuel or fluid on a molecular level to neutralize instantaneously one or more capacity of the fluid or fuel to enter into a condition which creates heat, a shockwave, or any other force. The S1+ fuel mixture, if neutralized in original form will also be neutralized if the fuel mixture, because of secondary crash conditions is changed in configuration. For example, existing neutralizing atmospheric solutions with nitrogen will remove oxygen from above the fuel to avoid ignition conditions. But at high velocity and high impact conditions, for example in case of a crash landing, the fuel may still ignite as it is spread over a larger surface or when the ignition energy lowers because of increased pressure.

The second step is called an "anti-trauma" mechanism, aka the X2, and is a second pressurized canister filled with a second type of solution named the S2 for simplicity. The S2, unlike the S1 designed to chemically neutralize a fluid is designed to be released atmospherically within a volume for rapid growth, partial density and force absorption capacity and quick release of form for allowing atmospheric air to return. The S2, like shaving foam, is released quickly and grows in volume to a density able to accommodate form. The X2 is a canister of pressurized S2 product to be released.

Figure 2:
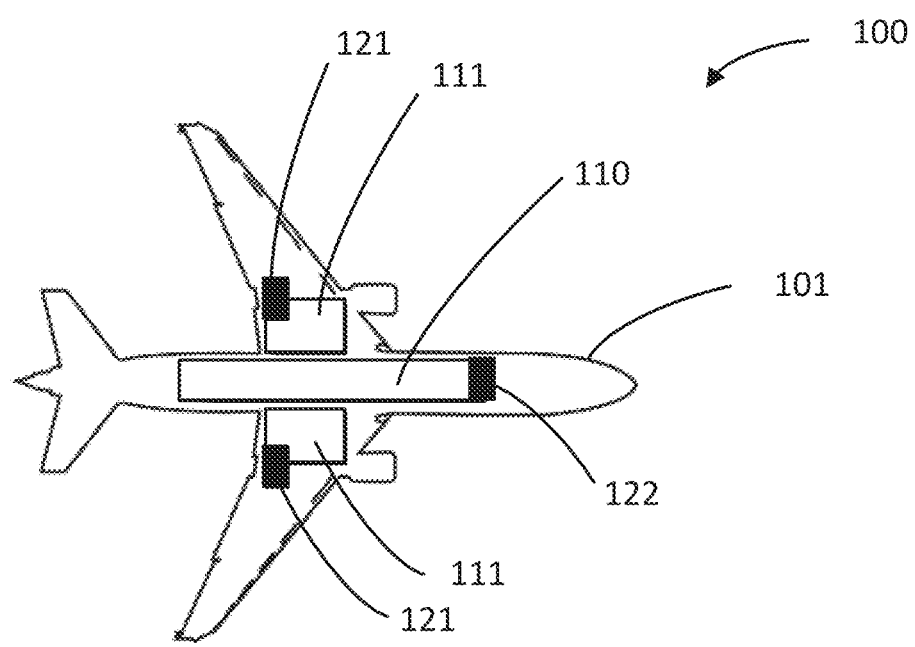
FIG. 2 is an illustration of a sample craft showing an embodiment of a system for protecting inhabitants of a volume and illustrating the location of an anti-explosion device and an anti-trauma device according to one embodiment of the present disclosure.

FIG. 2 is an illustration of a sample craft 101 showing an embodiment of a system 100 for protecting inhabitants of a volume and illustrating the location of an anti-explosion device 121 and an anti-trauma device 122 according to one embodiment of the present disclosure. As illustrated in a plane 101, the system 100 can include two components, the X1 shown at 121 on two fuel tanks 111 and a X2 122 shown to connect with a passenger compartment 110. While one possible configuration is shown, one of ordinary skill in the art will recognize that depending on the size of the fuel tank, the model of the plane, and the size of the X1, each plane must be analyzed volumetrically to calculate the optimal ration of S1 to fuel and more importantly also optimize release and dispersion speeds of the S1 into the fuel.

As shown at FIG. 2, a system has the ability to react as needed using both of the X1 and X2 options as needed and when needed. For example, an airplane's mode of operation might include that fuel may not be dumped over high density population and as a result the X1 system must be powered instead of initiating a fuel dump. In addition, the procedure might be that in case of landing, if the landing gear is fully deployed the X2 system is not needed as the ordinary emergency landing procedures are to be used preferentially. As contemplated, the X2 system for example might be powered in case and at the moment of a loss of air pressure in 1 or two of the tires of a single landing gear. The X1 and X2 system as explained come to add and/or substitute to know and existing systems as needed. The military may equip high risk helicopters with this system which would be powered in whole or in part in case of certain key scenarios.

The Anti-Trauma System (X2)

As part of the disclosure, the inventor provides at least several designs of a new apparatus/hardware to be used, for example, in the field of avionics may be branded as the X2 AVIA™. Generally speaking, a cylindrical body 1 as shown on FIG. 4 is designed to be split and separated into two different cavities as on either side of curved piece 7 as illustrated at FIGS. 4-13. As shown in FIGS. 6 and 12, "Cavity A" is formed to the left of the wall 7 up to the left portion of the device as shown and enclosed by the pieces 7 and 3, and "Cavity B" is formed on the right of the wall 7 to the tip on the right as shown and enclosed by the different pieces 7 and 2.

In one embodiment, Cavity A and Cavity B are separated by an elastic/deformable membrane 7 which is shown with a curved section as pressurized. Such a membrane 7 may be made of any polymer or material which is not corroded, damaged, or made to be brittle over time in contact with either of the two products to be placed in Cavity A and Cavity B.

As described, one cavity (either Cavity A or Cavity B) is filled upon by a gas and may feature a trigger to be activated to allow the stored pressure gas. Such a trigger may take on multiple forms such as, for example a metal capsule of CO2 gas or any other neutral gas container. In some cases, the pressure will be sufficient not to require a trigger or any other device which is able to quickly (i.e. within a fraction of a second) generate increased pressure in the cavity. While one cavity is filled with the gas or the non-liquid fluid, the other cavity is filled with an active chemical substance having the property of neutralizing atmospheric conditions. Generally speaking, the gas is used to drive the S2 liquid. As described above, in the preferred mode, as shown at FIGS. 2-7, Cavity A contains the S2 liquid and Cavity B contains the pressurized/low pressure driving gas. In one embodiment shown at FIG. 7, an explosive lead 8 may be used in place or instead of pressurize gas to help generate a driving force for the gas.

As shown at FIG. 6, on the left is a "nozzle assembly" used to release the S2 liquid inside of a cabin. The nozzle assembly is made of elements 3, 4, 5, and 6. Some of the advantages of the current invention shown with specificity at FIGS. 2-7 is the capacity for all of the S2 liquid to be sprayed and limit the quantity remaining in the device, the long operational period of the device, the low weight of this device, and a very limited number of parts used to limit degradation, leaks, or wear of other mechanical type during use or storage. As described, the material of the different components forming the device shown at FIGS. 4-13 are selected and used to hold under the pressure blast, not to be corroded by external environmental factors and more importantly not to react with the S2 liquid used.

The device as shown at FIGS. 4-13 which in one embodiment as shown has a cylindrical body 1, end caps 2, 3, and exhaust 4, 5, and 6 which is hermetically sealed. The elastic/deformable membrane 7 is mounted as shown inside the cylinder body 1 of the device either by itself as shown at FIG. 4 or placed at a different location as shown at FIG. 5 to alter the ratio over the Cavity A to Cavity B. In an alternate embodiment (not shown) a spacer piece also cylindrical can be inserted to maintain the membrane 7 in place. In one embodiment, a zirconium detonator 8 is mounted in the end cap 2 as shown both at FIG. 8. One of ordinary skill in the art will understand how such a detonator 8 can be powered and initiated upon request via an electrical signal sent from outside of the device (not shown). The exhaust body is provided with a guide 5, a limiter positioning sensor and a sealing contact surface as shown 4, 6. While one type of simple exhaust piece is shown, with very simple configuration, one of ordinary skill in the art will recognize that any type of exhaust system may be substituted or used, for example the systems known and used in other types of gas release systems.

The spray valve mounted in the exhaust body is provided with insert seals as shown in relation to not be degraded by the S2 liquid and the atmosphere. These pieces are shown as 6, and 5. As shown at FIGS. 4-13, the device is mounted to a floor or any other surface 12. This device may be mounted to any surface as shown using guides 10 and clips 11.

The device has shown, in one embodiment, has a volume of about 1½ liters but as one can imagine it may be adapted and modified in shape and size to accommodate any type of aircraft, any vehicle, or any location or room where these devices are needed. As shown, the device can be mounted below the surface for hiding it from view and from protection. The system as shown is below the surface 9 by a fraction of an inch, for example ⅛ of an inch. As contemplated, for optimal aircraft use, the devices not exceed 3.7 lbs in weight. The electronic control module of this device can be added (not shown) to the flight control board of a plane or any other local or remote system.

The product can be made of multiple alloys and composite materials with various sizes based on the volume to be treated. As shown, the system is designed with the exhaust to accommodate pressure variations normally encountered in the airline industry or any other industry where the device is placed. In one embodiment, the system is designed to support up to 30 bars (i.e. 450 psi) in compression to be able to withstand without damage the detonation of the zirconium-based detonators.

Figure 8:
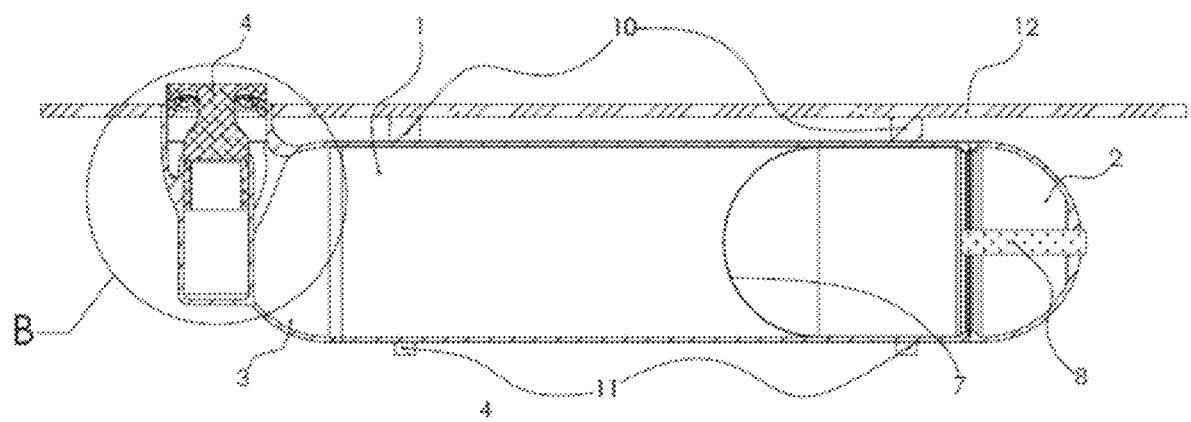
FIG. 8 is a side elevation cut view along the middle of the anti-trauma apparatus shown in FIG. 4 according to another embodiment.
Figure 9:
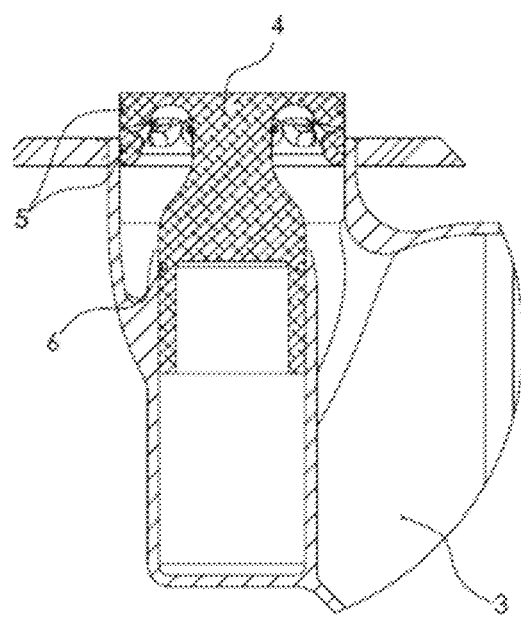
FIG. 9 is a close-up view of the detail illustrated as B on FIG. 8.
Figure 10:
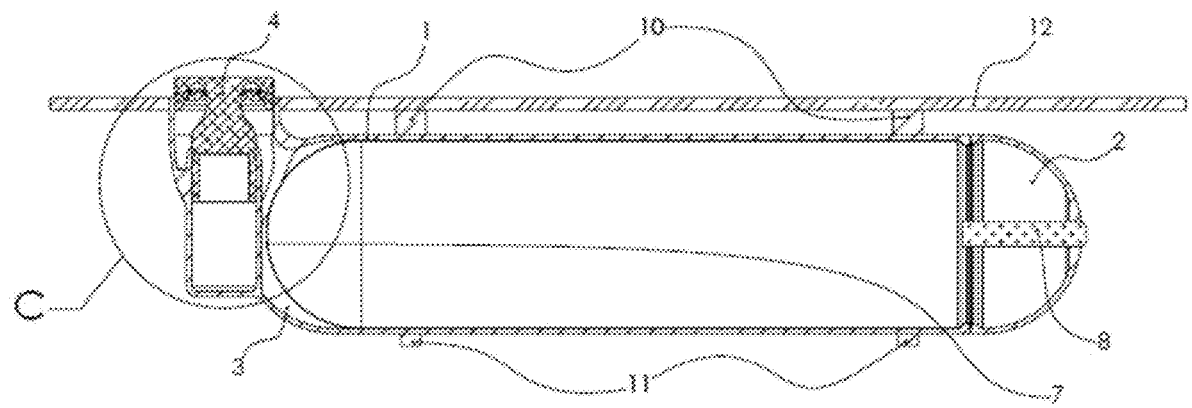
FIG. 10 is a side elevation cut view along the middle of the anti-trauma apparatus shown in FIG. 4 according to a third embodiment.
Figure 11:
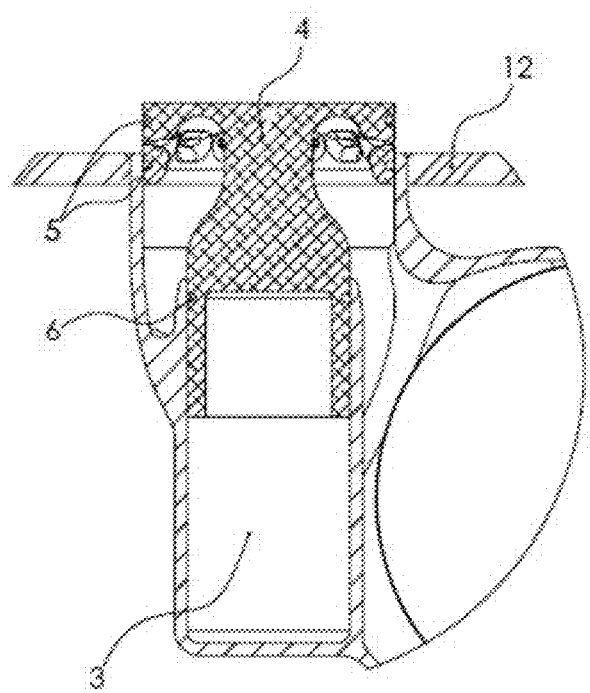
FIG. 11 is a close-up view of the detail illustrated as C on FIG. 10.
Figure 12:
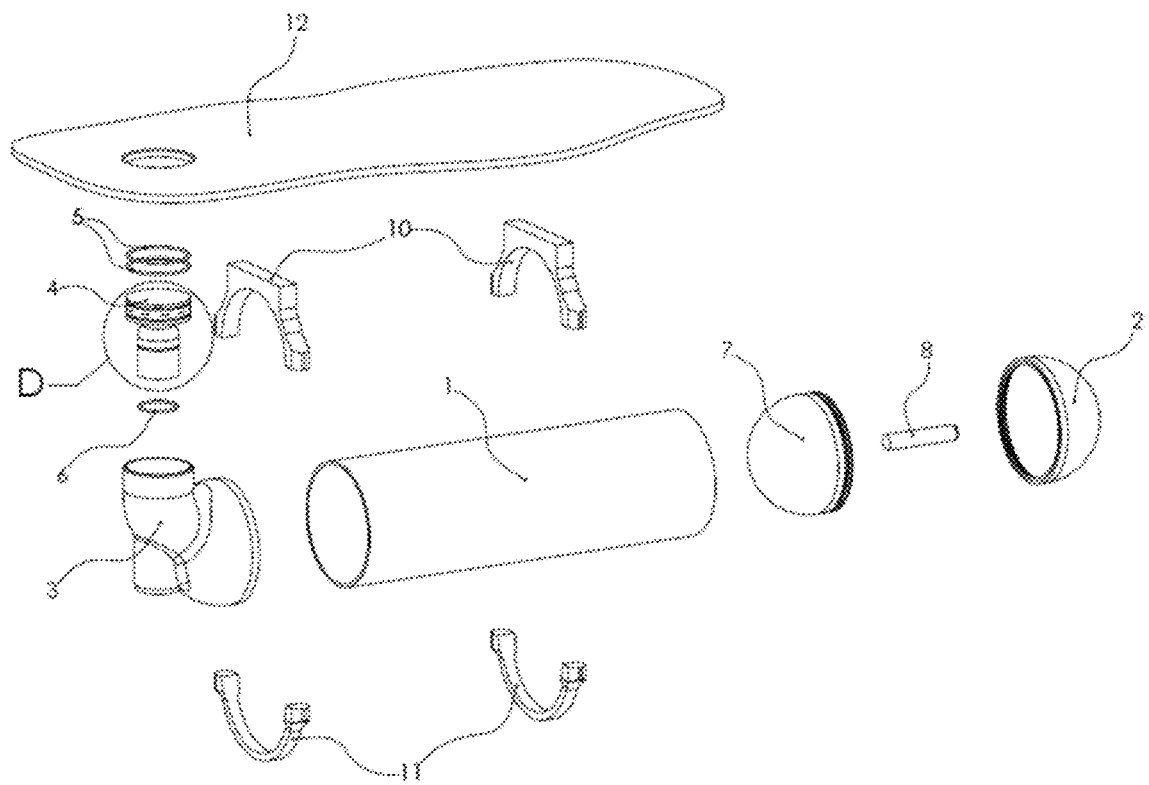
FIG. 12 is an exploded view of the device as shown at FIG. 4.
Figure 13:
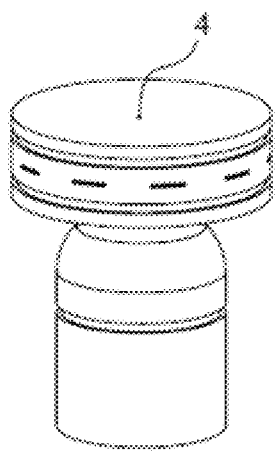
FIG. 13 is an illustration of the detail D as shown at FIG. 12.
Figure 14:
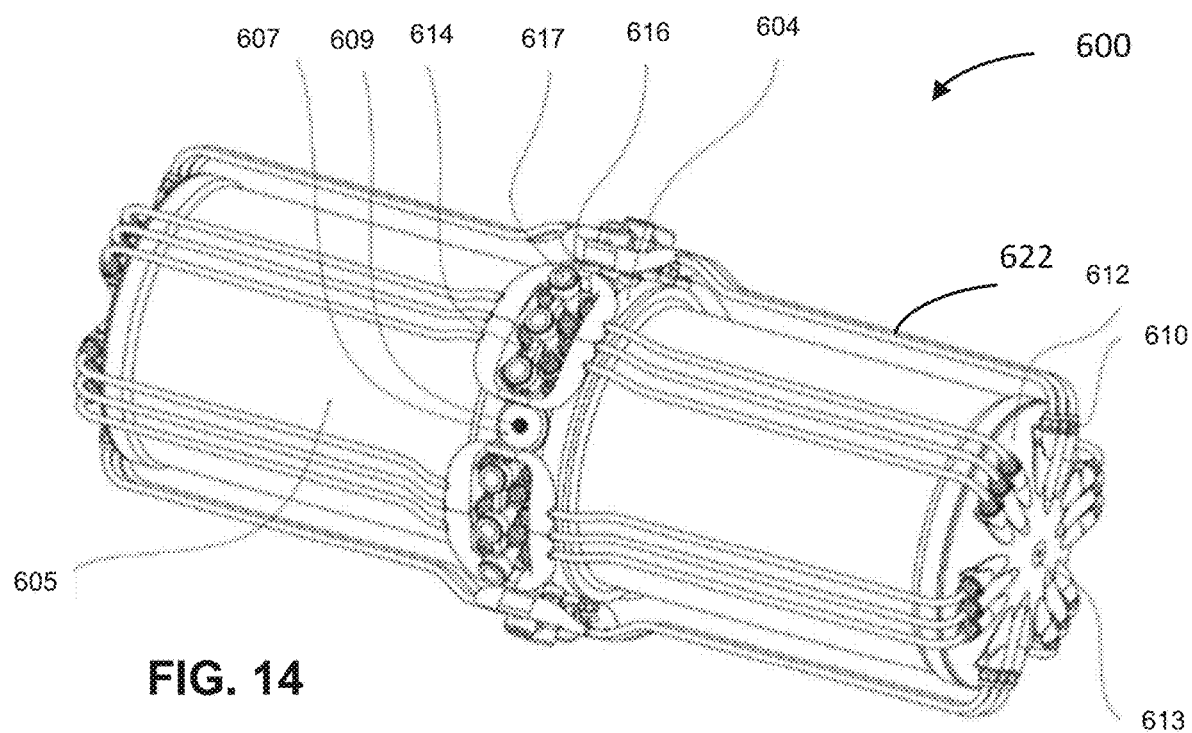
FIG. 14 is an isometric external view of one possible embodiment of the anti-explosion apparatus for use alone or as part of the system for protecting inhabitants of a volume as shown generally at FIG. 2.
Figure 15:
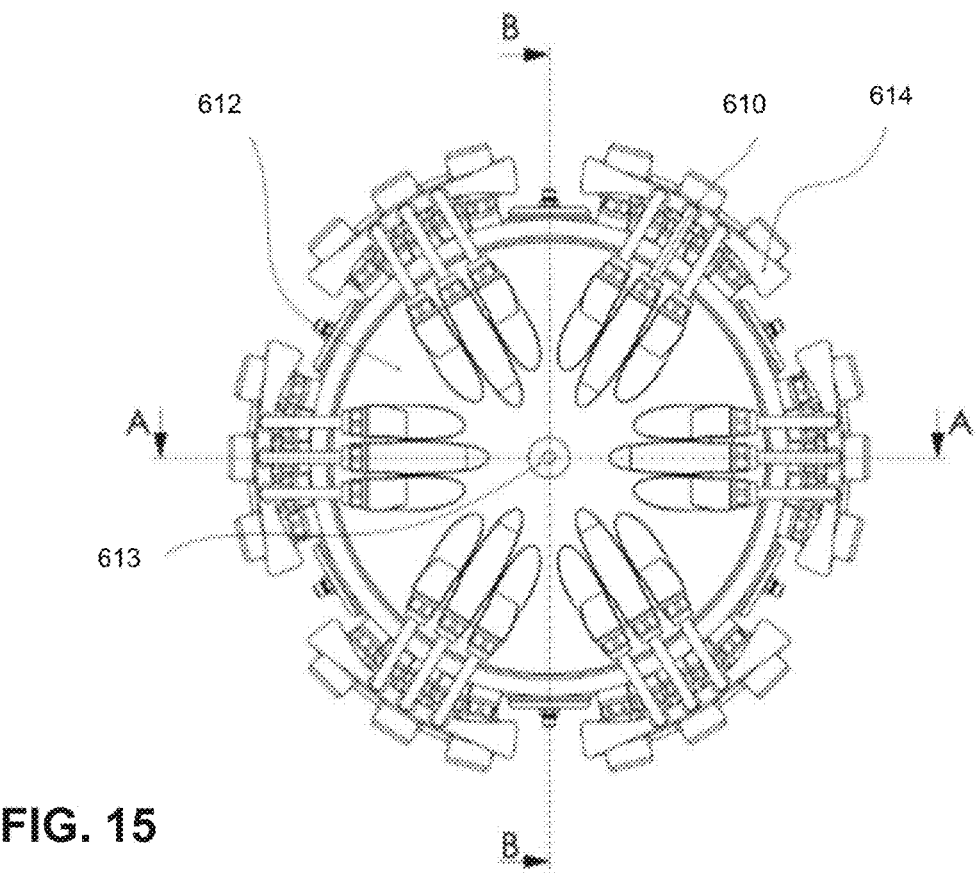
FIG. 15 is a side view of the anti-explosion apparatus shown at FIG. 14 according to an embodiment of the present disclosure.

As shown, the spray valve is embedded into the storage area of the S2 liquid, thus forming a single volume, which minimizes the volume of the unused device. Upon receipt of the electronic control command of the device, generated by the aircraft control board, the control module detonates the lead 8 as shown at FIG. 8, thus initiating the gas deflagration process in the Cavity B. Afterwards, there is an increase in the pressure, volume and temperature of the gas in the Cavity B, exerting force on the S2 chemical substance from the cavity a through the elastic/deformable membrane 7. As a result, the S2 substance tends to move instantly through the exhaust body 3 to the spray valve 4, spraying it into the aircraft cabin. The elastic/deformable membrane 7 pushes with a constant and high pressure of about eight bars, the S2 chemical substance from the Cavity A, ensuring a uniformly distributed spraying process. A detail of this valve 4 is shown at FIG. 13.

The spray valve 4 is sealed by means of seals 5, 6. See details as FIGS. 7, 9, and 11. Mechanical wear is minimal and only occurs at lifting the spray valve 4. The whole process as a complex ensures a working time of about 0.1 (zero point one) seconds. FIG. 7 shows the valve 4 and the cap in low position (without flow) and FIG. 9 shows the cap raised by a fraction of an inch where the flow is lateral via a series of holes. At the heart of all of these processes is a simple system designed to open with internal pressure and remain open for single use. The mechanism is also equipped for delivery of the S2 in a way which is preferred.

The inventor provides that a number of X2 systems will vary based on the need in a craft. For example, these can be placed below the seat and be equipped with sufficient power to encase two aligned seats. In one embodiment, the number of seats is multiplied by 2 capsules plus 20% for corridor volume. In a 180 seat plane, the system requires about 380 X2 systems under the seats to fill in the volume.

In one embodiment, the anti-trauma device for mounting to a volume for holding passengers includes an outer hollow cylindrical body connected at one end to a cap and at the other end to an exhaust with a cylindrical valve and cap with a body for moving from a low position to a high position by a fraction of an inch having a series of lateral holes for releasing a solution inside the hollow body, the hollow body mounted to a wall of a volume for holding passengers, a cylindrical membrane inside the hollowed body for defining a first cavity between the membrane and the exhaust for holding a liquid, and a second cavity between the membrane and the cap for holding a pressurized gas, and a quickly expanding chemical solution in the first cavity, and a detonator for expanding a gas found in the second cavity, wherein the quickly expanding chemical solution is a force absorbing compound with quick release capacities.

Alternatively, the anti-trauma device also has an outer hollow body, is a cylinder, the end cap a semi-spherical ball and the membrane is elastic, the cylinder, end cap, and the exhaust are made of a non-corrosive alloy. The alloy may also be a composite material, exhaust includes a spray valve hermetically mounted in the exhaust body with a guide, a limiter, a positioning sensor and a sealing contact surface, and the inside surface of the hollow body has an inside surface polished with low roughness for the better release of the liquid via the exhaust.

As explained above, in addition to these devices as shown, what is also contemplated is a method of filling a volume with chemical solutions using a plurality of anti-trauma devices, the method comprising the steps of counting the number of passengers designed for protection within a volume for holding a fixed number of passengers, applying an algorithm to determine from the number of passengers a needed number of anti-trauma devices, and attaching to the outside surface of the volume for holding the fixed number of passengers the devices made of an outer hollow cylindrical body connected at one end to a cap and at the other end to an exhaust with a cylindrical valve and cap with a body for moving from a low position to a high position by a fraction of an inch having a series of lateral holes for releasing a solution inside the hollow body, the hollow body mounted to a wall of a volume for holding passengers, a cylindrical membrane inside the hollowed body for defining a first cavity between the membrane and the exhaust for holding a liquid, and a second cavity between the membrane and the cap for holding a pressurized gas, and a quickly expanding chemical solution in the first cavity, and a detonator for expanding a gas found in the second cavity, wherein the quickly expanding chemical solution is a force absorbing compound with quick release capacities.

In a different embodiment, the exhaust includes a spray valve hermetically mounted in the exhaust body with a guide, a limiter, a positioning sensor and a sealing contact surface, and wherein the spray valve is mounted between adjacent seats in the volume.

The Anti-Explosion System (X1)

FIGS. 14-27 show as part of one embodiment the anti-explosion 600 also branded as the X1 Avia™. To help understand generally how the system works, a main body shown at FIG. 14 is designed to hold two liquids S1a and S1b separated by a central piece on both symmetrical sides of a pressurized and puncture resistant volume. The device 600 is formed of two hollow cylindrical pieces 605 made of stainless or other inert steel attached on one side to a circular thick ring 604 also made of stainless steel. At both ends of the cylindrical bodies 605, are mounted end plates 612 also called by the inventor a cap 612 to close the volume. These three pieces are shown assembled at FIG. 14 and while what is shown is S1a on the left and S1b on the right and where both volumes are identical in size, one of ordinary skill will understand that based on the ratio of the two products to be used, the central portion may be moved to one side or the geometry of the cavity and may be modified to accommodate volume variations.

In order to form two side compartments within this structure, two valves 601 are attached inside the internal cylindrical bodies 605 as shown for example at FIG. 16. At the heart of the anti-explosion system is the capacity of the fluids S1a and S1b to merge into S1 and mix with the fuel that either surrounds the outside of the container 600 if it is placed directly inside the fuel or lines will be used to bring the S1 fluid into the tank. In one embodiment, a pressurized gas is pushed into the device as a driving force for both fluids to converge to the central part for mixture and release. In another embodiment, in case of failure of pressure in the gas system or other outside system, explosive charges are placed inside an inert volume of gas to rapidly expand it and serve as driving force for the liquids S1a and S1b. Generally, the system is designed to operate and create flow of the liquids with 8 bars pressure only (i.e. about 120 psi) but the system is also designed to resist crash and explosion pressures and explosions for a failure of 120 bars.

Figure 16:
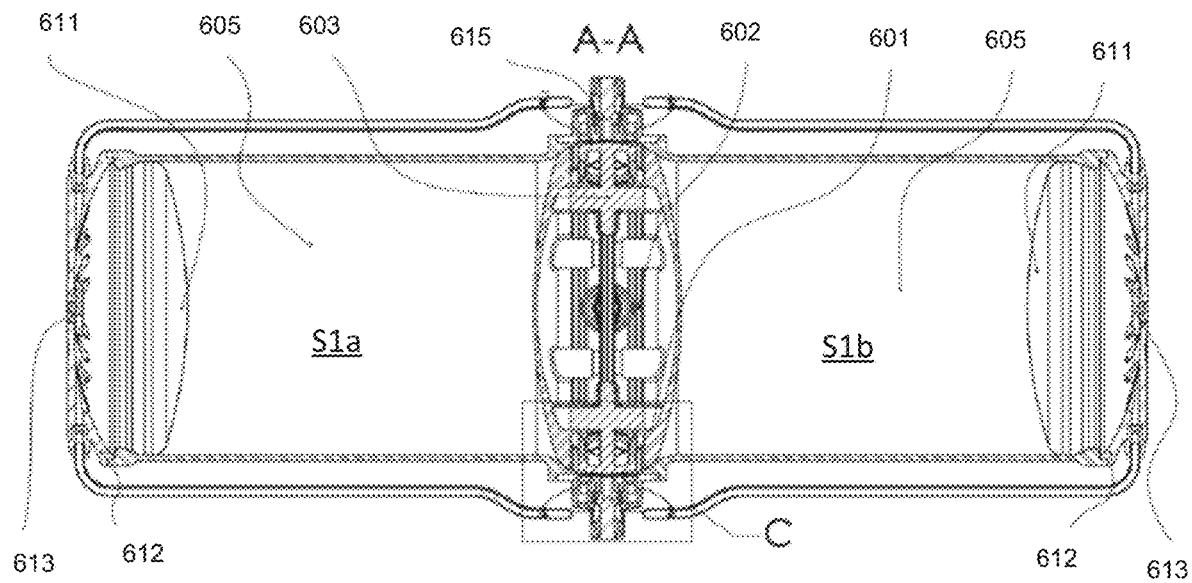
FIG. 16 is a view alongside the plan A-A as illustrated at FIG. 15 of the anti-explosion apparatus in a resting state according to an embodiment of the present disclosure.
Figure 17:
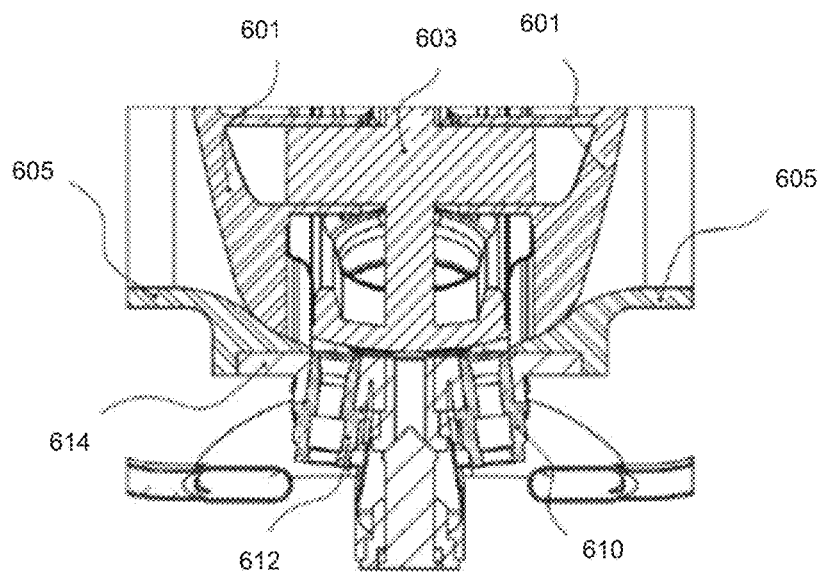
FIG. 17 is a close-up detailed view of the piece illustrated as C in FIG. 16 of the release mechanism shown in the resting state according to an embodiment of the present disclosure.
Figure 18:
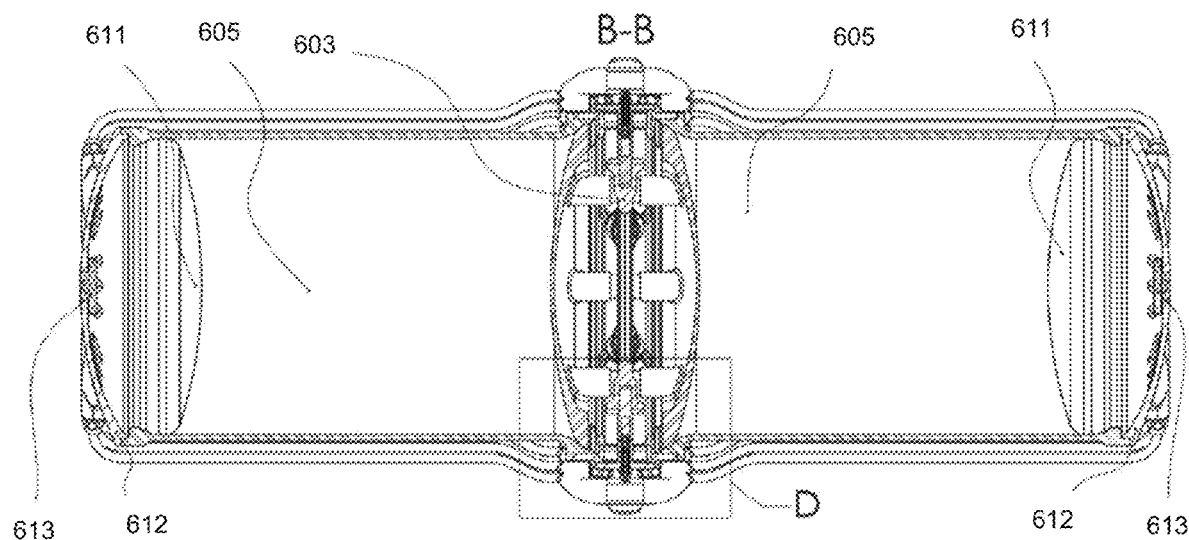
FIG. 18 is a view alongside the plan B-B as illustrated at FIG. 15 of the anti-explosion apparatus in a resting state according to an embodiment of the present disclosure.
Figure 19:
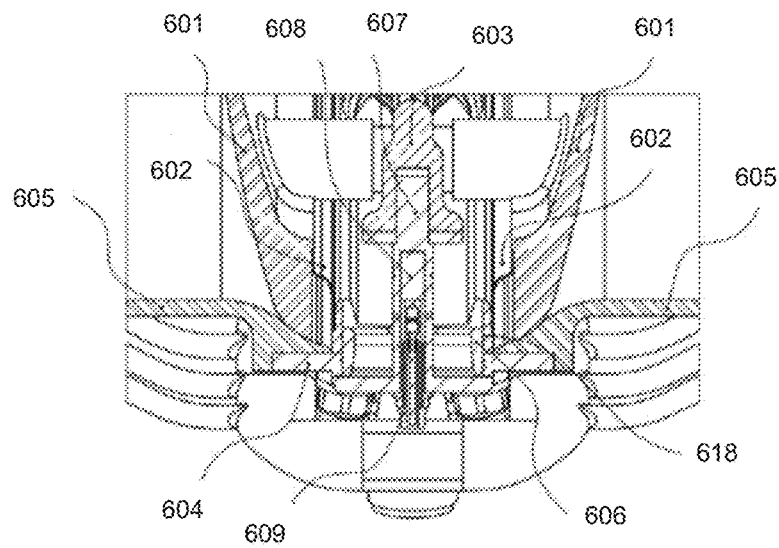
FIG. 19 is a close-up detailed view of the piece illustrated as D in FIG. 18 of the release mechanism shown in the resting state according to an embodiment of the present disclosure.
Figure 20:
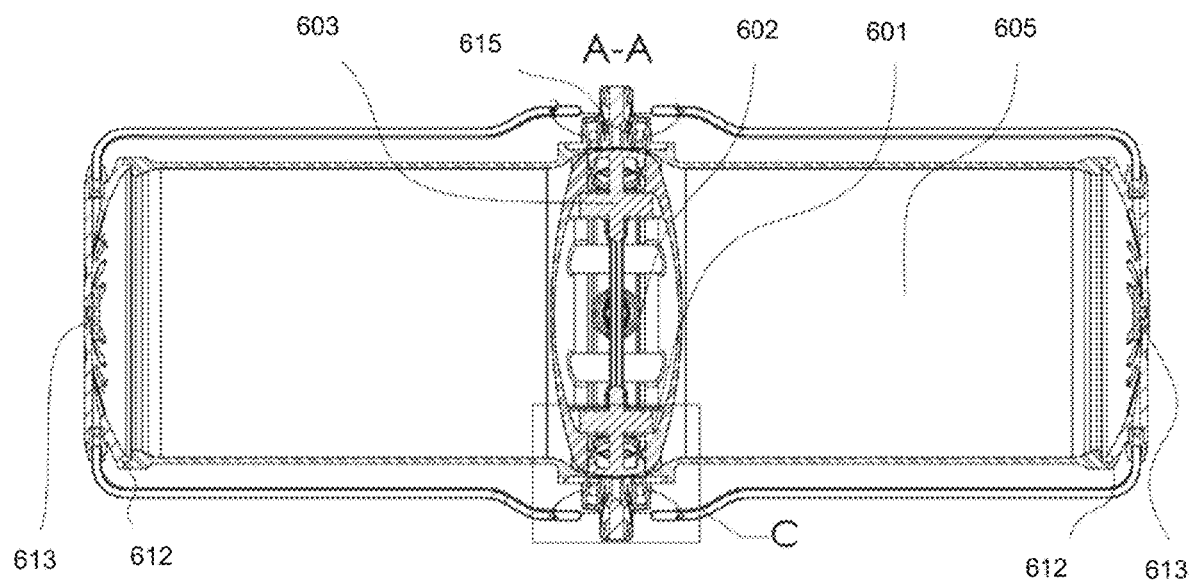
FIG. 20 is a view alongside the plan A-A as illustrated at FIG. 15 of the anti-explosion apparatus in a active state according to an embodiment of the present disclosure.
Figure 21:
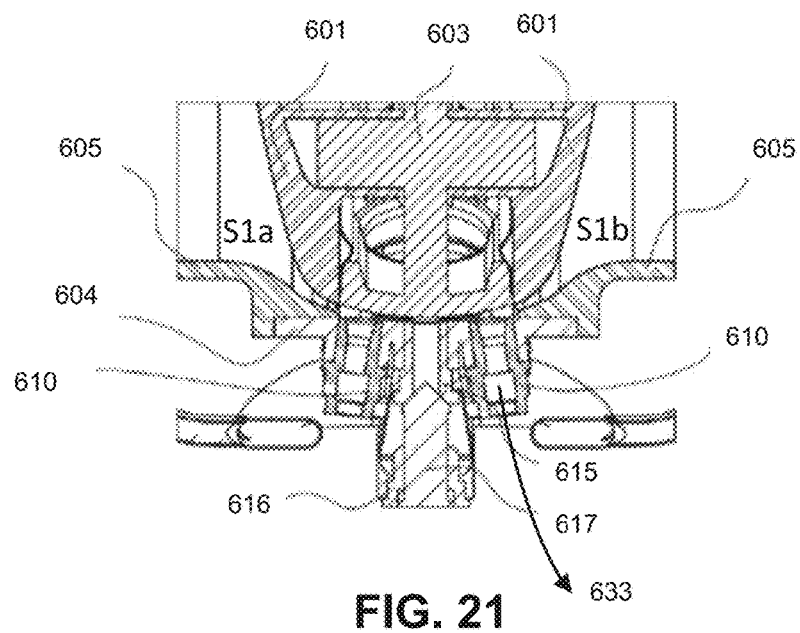
FIG. 21 is a close-up detailed view of the piece illustrated as C in FIG. 20 of the release mechanism shown in the active state according to an embodiment of the present disclosure.
Figure 22:
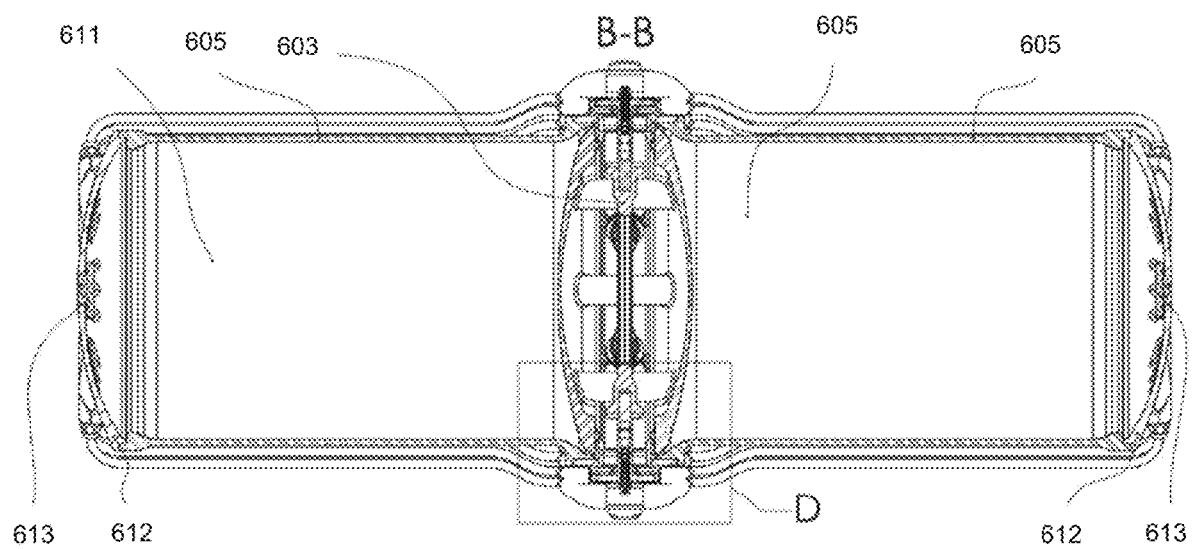
FIG. 22 is a view alongside the plan B-B as illustrated at FIG. 15 of the anti-explosion apparatus in a active state according to an embodiment of the present disclosure.
Figure 23:
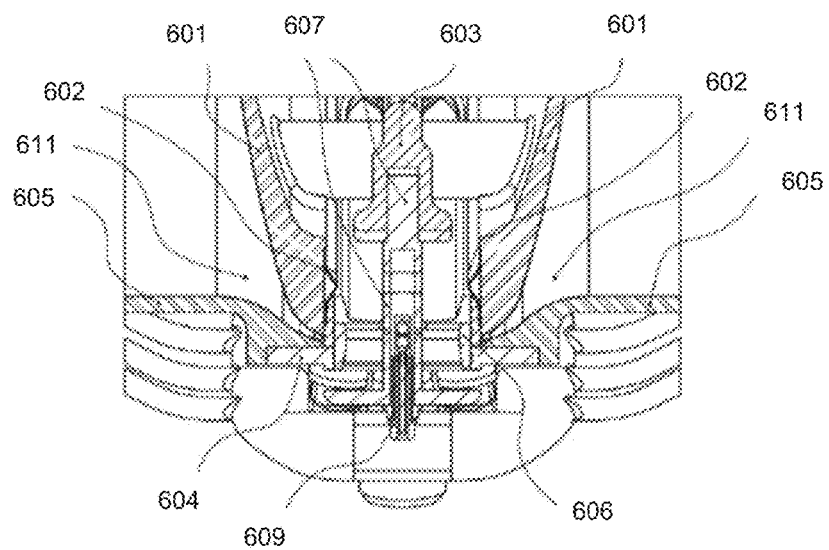
FIG. 23 is a close-up detailed view of the piece illustrated as D in FIG. 22 of the release mechanism shown in the active state according to an embodiment of the present disclosure.
Figure 24:
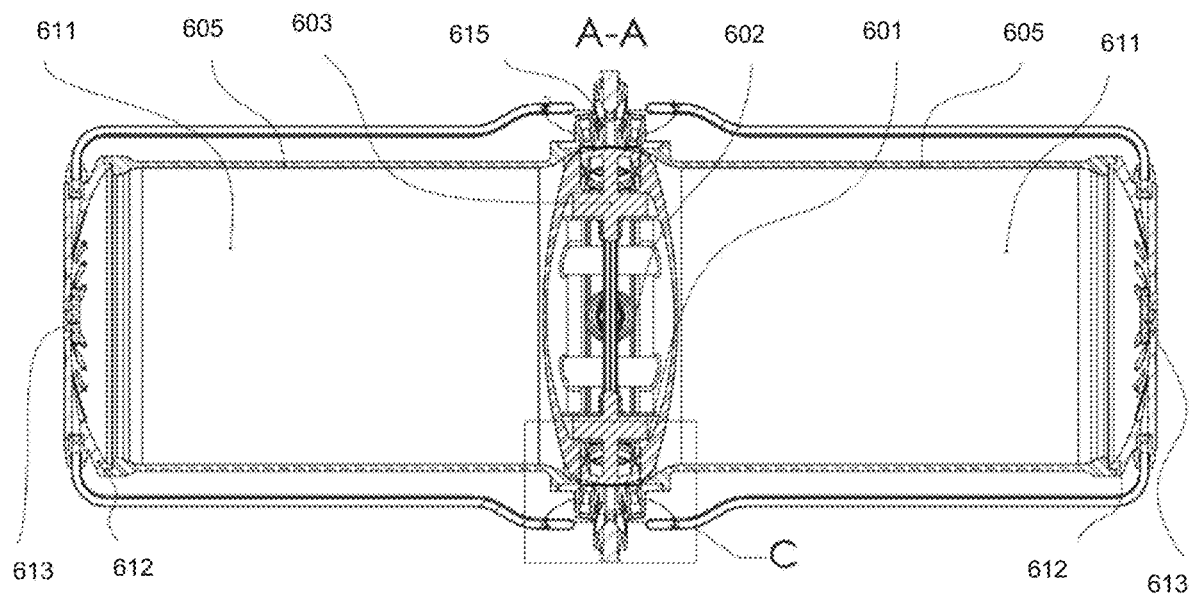
FIG. 24 is a view alongside the plan A-A as illustrated at FIG. 15 of the anti-explosion apparatus in a final state of operation according to an embodiment of the present disclosure.
Figure 25:
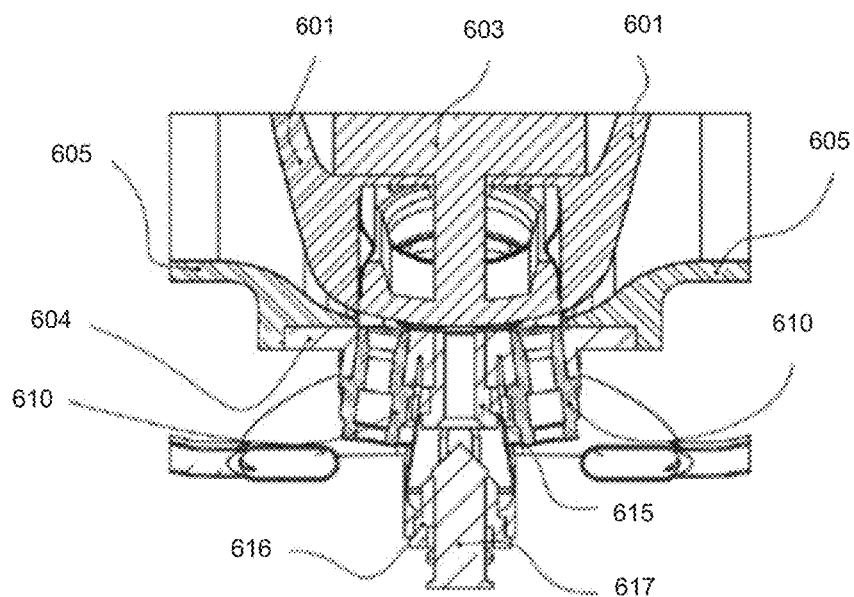
FIG. 25 is a close-up detailed view of the piece illustrated as C in FIG. 24 of the release mechanism shown in the final state of operation according to an embodiment of the present disclosure.
Figure 26:
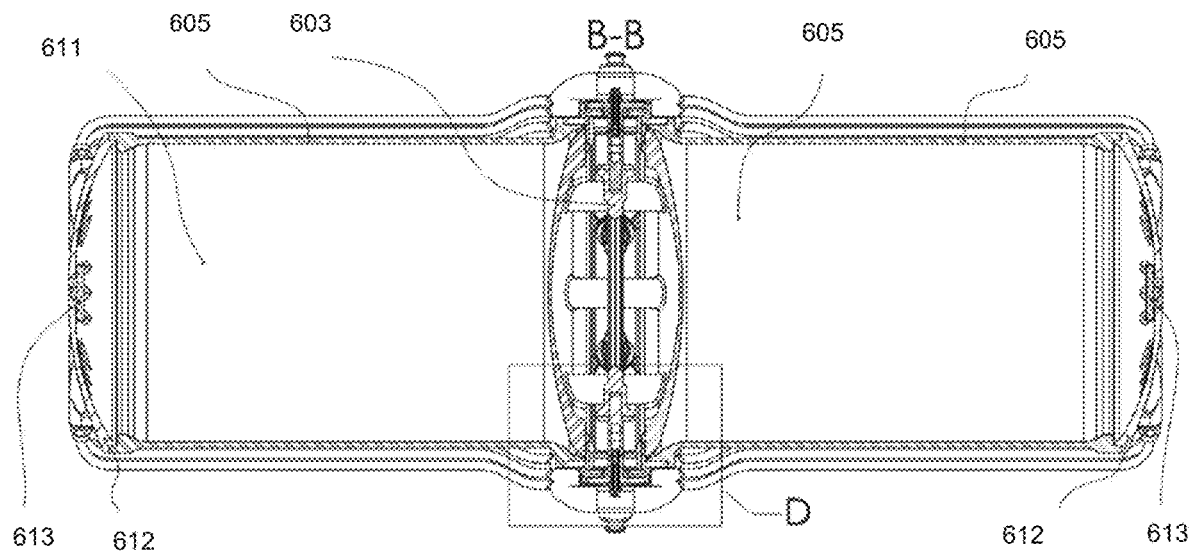
FIG. 26 is a view alongside the plan B-B as illustrated at FIG. 15 of the anti-explosion apparatus in a final state of operation according to an embodiment of the present disclosure.
Figure 27:
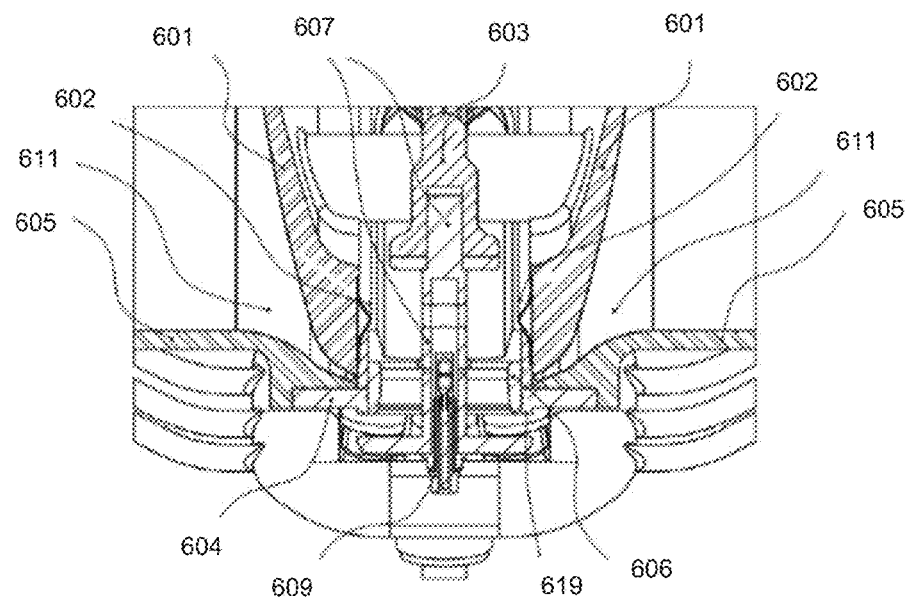
FIG. 27 is a close-up detailed view of the piece illustrated as D in FIG. 26 of the release mechanism shown in the final state of operation according to an embodiment of the present disclosure.

For example, gas is connected to an entry port 609 as shown at FIG. 17 and travels into the rounded bulb 614 and enters a series of longitudinal pipes 622 and travels to the end plates 612 to bushings 610 before being pushed inside both sides volumes between the end plate 612 and a moving diaphragm 611 as shown at FIG. 16.

The objective is to push pressurized gas or liquid as described above and for the air to migrate up the eighteen pipes on each side 622 and enter the volume via the bushings 610. The use of multiple pipes 622 allows for a quicker response time of the system and thus lowering of the effective pressure. Also, the use of six sets of three pipes 622 in the different bulbs 614 allows for redundancy. As shown, a single diaphragm 611 is filled by all eighteen pipes 622 or any combination thereof.

Once pressurized gas moves into the system, up the pipes 622 along the eighteen bushings 610 on each side and enters the device, the pressure will place a driving force upon the diaphragm 611 so they move inwardly toward the center.

The gas for example may be inert or any other type of compressed gas which will serve as driving force to help push S1. It is known a device operating with the active chemical solution S1, preventively being divided into two components. The device of the proximal invention stores the active chemical solution S1 and, when the device is activated, transports the active chemical solution S1 to the fuel tanks of the aircraft. The device of the closest invention consists of a hollow cylinder which is transversally separated into two equal volumes (in one embodiment) and by two perforated discs on which a membrane is applied, which breaks under the action of pressure. The two equal volumes are equipped with sealed pistons that separate each of the two equal volumes into two other hermetic sub-cavities. Each sub-cavity, which contacts the perforated discs, is filled with one of the components of the active chemical solution S1, and the extreme sub-cavities are filled with gas. The extreme sub-cavities are connected to the fuel tank filled with gas under pressure and separated by electronically guided valves. The two perforated discs are mounted equidistant from the transverse center of the cylinder at a distance equal to the inner diameter of the pipes connected to the transverse center of the cylinder. The extreme ends of these pipes are connected to the aircraft fuel tanks. These two perforated discs form the mixing and evacuation area.

The X1 is a symmetrical and hermetic device whose function is to store and transport the active chemical solution S1 to the fuel tanks of the aircraft. During storage, the active chemical solution S1 is divided into two separate components, called the chemical solution S1a and chemical solution S1b. The chemical solutions S1a and S1b, both the result of their mixture and the active chemical solution S1, are in the state of liquid aggregation. During the operation of the device, X1 mixes the chemical solutions S1a and S1b, forming the active chemical solution S1, after which it is transported through pipes/hoses into the aircraft tanks and subsequently sprayed.

The cross summary section of the pipes limits the passage of large volumes of active solution S1 to the sprayers 610 as shown at FIG. 19. The cavities of the device do not have developed hydrodynamic and aerodynamic character, which creates an obstacle to the movement of liquids and gases. The presence of pistons fitted with seals has the property of losing hermeticity due to mechanical shocks, which are highly probable in exceptional situations. The cavity walls tend to enter into chemical reaction with the stored active chemical solution S1.

The X1 system 100 represents a device made up of two cylindrical tanks, storing separated the chemical solution S1a and S1b as shown at FIG. 14, hermetically separated by a valve system 601, enclosed in a cylindrical body 605 provided with a mixing zone and subsequent evacuation. The tanks 605 are separated into two cavities by an elastic/deformable membrane 611 as shown at FIG. 16 where on one side it is filled with one of the two components of the active chemical solution S1 and the other filled with gas. The gas-filled cavities (shown as the exterior most components) communicate through a piping system and valves with the mixing and exhausting area of the active chemical solution S1, thus forming the total exhaust system. The valve system is an external ring 604 as shown at FIG. 14, equipped with a support disk on which two valves are assembled, together forming a hermetically sealed internal volume filled with gas under the pressure. The valve system is equipped with a series of sealed shaft caps, which have the function of evacuating the gas from the volume created by the valve system after increasing the pressure of the chemical solutions S1a and S1b. The shaft caps are mounted directly into the disc support through the shaft body of this cap. Shaft caps are equipped with a pyrotechnic charge that transversely cuts the shaft of the cap. In the external ring of the valve system, there are standard pipes/hose connections, such as fitting push-in and pipe and valve system connections. The pipes/hoses end up with sprayers in the fuel tanks of the aircraft.

Each X1 device is designed in such a way that by modifying the size and volume of the device, it can easily be adapted to all civil, private and military aircraft models. And its construction, both sizes and mass, do not exceed the limits of constructive standards of the aviation industry. Due to the extensive use of light alloys and composite materials, the X1 achieves a considerable decrease in total mass. In addition, the surface of the cavity, which contacts the active chemical solution S1, treated with liquid ceramics or other inert coating, allows for long-term preservation of the X1 device. Inert coatings may take the form of many different types, including a metallic surface finish like iridium or other heavy element, a polymer deposit like Teflon™ or any other possible finish based on its reactiveness with S1a and S2a. Since both cavity products S1a and S2a may be different and have different corrosion, the surface finish may be of different nature.

As shown, the device 600 contains a large number of pipes/hoses 622 as shown at FIG. 14 for the transfer of gas but also a large number of exit pipe/hose 610 as shown at FIG. 21 for the evacuation of the active chemical solution S1 633 (i.e. the mixture of S1a and S1b), together S1 forming a summary section crossed over, thus decreasing the time required to evacuate the active chemical solution S1 and favoring the passage of a large volume of active chemical solution S1. What is also known is the connection of these different pipes 610 to a network (not shown) of pipes for the transfer to a different location. One of ordinary skill in the art will recognize that in a preferred embodiment, the device 600 may be directly placed inside a fuel tank to increase speed of action. Since the device 600 also is equipped with different explosive charges, regulations may require that the device 600 be placed in proximity but not in explosive range in case of detonation. In such cases, the location preferred is as close as possible but outside of the range and the use of deflector shields may be contemplated.

The device 600 is also equipped with a pneumatic exhaust system of the active chemical solution S1 from pipes/hoses, which increases the efficiency of the device, effectively decreases the total mass of all the active chemical solution S1. The pneumatic system is powered by the same cavity that provides movement of elastic/deformable membranes. This simplifies the working principle and ensures a management system of volume and pressure of the gas being in the deflagration process. Also, the use of a cylinder with openings and exits around the entire periphery is designed to further increase the release speed of the S1 product in the tank. While such configuration is contemplated as the best mode by the inventor at this time, one or ordinary skill in the art may understand that space limitations, design parameters may result in the need for the release to be non-periferical.

The device 600 provides a short spraying time, because of the hydrodynamic forms of the surfaces which contact the active chemical solution S1. The elements that are active during the movement of the device have small masses, thus has low inertia, thus increasing the overall effectiveness of the device. The absence of pistons eliminates the problem of sealing and the friction forces created by these seals. The device 600, in relation to the technical state, solves the technical problem in that the pistons were replaced by elastic/deformable membrane, which completely excluded inertia piston, friction created by seals and risk of loss of leaks after accident which may occur at take-off/landing of the damaged plane or in exceptional circumstances. The valve system compared to membranes that are broken by the pressure provides a larger passage section and a mixture of the best of the active chemical solution S1. The total pneumatic evacuation system ensure the evacuation of the entire volume of the active chemical solution S1 from mixing zone and ducts, being replaced by gas under pressure.

The mixing and separation device is equipped with two valves 601, one of the surfaces being convex and on the back equipped with guide tubes. Two flexible diaphragms 602 are hermetically connected by the internal piston ring 601 and by the outer ring fixed by the support disk 603. The support disk 603 is provided with guide rods supporting the valves 601. The support disk 3 is mounted in the cylindrical ring 4 with a series of perforations on the circumference, a part being provided for the fitting of the pipes/hoses, and the other part for coupling with the pneumatic system 14. In the cylindrical ring 604 there are six other seals with sealing surfaces 618, 619 (FIG. 604, 606, 608) in which fixers 606 are mounted, fixing the support disk 603 to the cylindrical ring 604. In the fixer 606 is mounted the shaft cap 607, which is generally formed from the shaft, at the end of which a disc is disposed transversally and concentrically (FIG. 604, 606, 608). In the shaft cap 607 is perforated, through the disc and shaft, a hole at a limited depth, located longitudinally and concentrically on the shaft. A pyrotechnic charge 608 is arranged in the perforated hole of the shaft cover 607 to cross the shaft transversely. The shaft of cover shaft 607 is perforated radially and transversely to the shaft, forming holes, which contact the longitudinal perforation and are located adjacent to the pyrotechnic charge 8 to the beginning of the longitudinal perforation. A nipple 609 is mounted in the longitudinal perforation of the shaft cap 607. In the cylindrical ring 604 there are mounted bushings 610 into which are connected pipes/hoses. The bodies 601, 602, 603, 606, 607 and 609 form a hermetic cavity filled with gas at a higher pressure than that of the active chemical solution S1 stored in the device 600. The bodies 601, 602, 603, 604 and 605 form the mixing zone of the active chemical solution S1.

The cylindrical tanks contain the cylindrical body 605, which at one end has a cap 612, together with the elastic/deformable membrane 611. The cylindrical body 605 is mounted in the cylindrical ring 604. In the cap 610 is mounted the detonator grip 613 and a series of bushings 610 in which the pipes of the pneumatic system 614 are mounted. The parts 601, 605 and 611 form the hermetic storage cavity of one of the components of the solution active chemical S1. The bodies 610, 611, 612, 613 and 614 form hermetic storage cavity of inert gas.

The base of the pneumatic exhaust system consists of the pneumatic system ducts 614, mounted on the cylindrical ring 604 and the caps 612. The pneumatic system ducts 614 are mounted in the cylindrical ring 604 by means of the hermetic bushing 615 (FIG. 605, 607). The pneumatic system ducts 614 are mounted in the caps 612 by means of the bushings 610. In the pneumatic system ducts 614 are mounted a series of sealed guides 16, where are mounted conical head valves 617. The conical head valves 617 are equipped with a pyrotechnic ring.

When receiving the electronic control command of the device 600 generated by the airplane control board, the control module detonates the detonator grips 613 mounted in the caps 612, thus during the deflagration process, increasing the gas pressure, which is rising on the elastic/deformable membrane 611, and then exerts force on the chemical solutions S1a and S1b. In the shaft caps 607 is activated the pyrotechnic charge 608 which transversely cuts the shaft and opens the sealing cavity thereby rapidly releasing the pressurized gas exerting force on the valves 601 by keeping them into the closed state. Following the sudden movement of the valves 601 in response, begins the rapid evacuation process of the S1a and S1 chemical solutions simultaneously ensuring a high gas pressure by the detonator grip 613. The chemical solution S1a and S1b are mixed in the mixing zone formed between the cylindrical ring 604 and the support disk 603. From the mixing zone, the active chemical solution S1 is distributed through a series of bushings 610 in which pipes/hoses are mounted. The active chemical solution S1 is sprayed into the aircraft fuel tanks through the pipes/hoses. When the active chemical solution S1 is completely discharged from the tanks, begins the substitution process of the active chemical solution S1 solution from the pipes/hoses and the mixing zone, with the gas provided by the deflagration process in the gas cavities, through the pneumatic system ducts 614. The detonating rings mounted on the conical head valves 617 detonate and move outwards the conical head valves 617. In this process, the gas stored in the pneumatic system ducts 614, under pressure and deflagration, moves active in the mixing zone and then in the pipes/hoses, thus substituting the whole S1 active chemical solution. This process is due to the fact that the pipes/hoses have an internal section sufficient to obtain the superficial tension effect, which does not allow the mixing of the active chemical solution S1 and gas in a dispersion.

The parts of the X1 device are made in a variable ratio of aluminum alloys (Al 87.1-91.4%, Cr 0.18-0.28%, Cu 1.2-2%, Fe maximum 0.5%, Mg 2.1-2.9%, Mn maximum 0.3%, Si maximum 0.4%, Ti maximum 0.2%, Zn 5.1-6.1%) and various composite materials. For the purpose of this disclosure, one active chemical substance is offered as "S1" and refers, at least in part, to the chemicals described by the article published and described as prior art. This liquid for example can include a number of active chemicals in different soluble formulations, namely cesium (0.3-0.9%), rutherfordium (0.1-0.6%), iodine (5.9-9.1%), magnesium (1.8-4.6%), hydrogen (15.4-19.2%), samarium (0.7-1.9%), rutherium (0.2-1.5%), potassium (10.5-15.1%), nitrogen (12.6-16.4%), phosphorus (7.1-9.9%), and perchloric acid (30.6-35.6%).

As described above, what is shown is an anti-explosion apparatus for the protection of inhabitants in a volume of a craft, comprising an outer hollow cylindrical body connected at both ends with a cap, a central ring with a valve system equipped with two diaphragms, the valve system enclosed in the outer hollow cylindrical body for defining between the diaphragms and the two caps lateral zones for the storage of chemical solutions, and wherein inside the valve system past the diaphragms is a mixing zone of the product, a pair of deformable membranes each within the lateral zones for the storage of chemical solutions to further designed a gas area for rapid expansion of the gas and a pneumatic system for the entry of pressurized compressible fluid via a series of tubes to the gas areas using nozzles.

The anti-explosion apparatus also includes the two lateral zones for the storage of chemical solutions and are each filled with a complementary solution for mixture and combination within the mixing zone for producing a fuel inertant solution and also a series of outlets for the quick release of the mixed solution in the mixing zone to the outside of the apparatus.

The inner surface of the outer cylindrical body is covered with a non-reactive agent, and wherein the pneumatic system includes six sets of three longitudinal tubes as the series of tubes and a series of explosive devices in the valve system.

Also contemplated is a method of inerting a fuel tank to avoid explosion by using an anti-explosion for the protection of inhabitants in a volume of a craft, the method comprising the steps of calculating the volume of fuel in a craft to be inerted, determining if the volume of fuel may be inerted by one or more anti-explosion apparatus in direct physical contact with the fuel of the craft or if the one or more anti-explosion apparatus must be distant from the fuel of the craft and connected via piping, and quantifying a number of anti-explosion apparatus needed and the location for optimal inerting of the fuel of the craft and further including the step of using a series of outlets for the quick release of the mixed solution in the mixing zone to the outside of the apparatus into a series of tubes if the apparatus is not in direct immersion in the fuel tank and for direct release into the fuel if the apparatus is in direct immersion in the fuel tank.

The System for the Protection of Inhabitants in a Volume of a Craft

Described above with great precision (see FIGS. 4-13) are the anti-trauma system (e.g. X2) for use adjacent to passenger compartment for protecting them from trauma linked with extreme conditions of the craft. Also described above with great precision is an anti-explosion apparatus (see FIGS. 14-27) to render the fuel in tanks of a craft inert (e.g. X1). In both cases, liquids and gases are used in tandem or in conjunction with electronic operations, sensors and fuses to power solutions (e.g. S1 and S2) to be used as described above.

What is described is a system for the protection of inhabitants in a volume of a craft, the system comprising at least an anti-trauma device for mounting to a volume of a craft for holding passengers, and at least an anti-explosion apparatus for the protection of inhabitants in the volume of a craft. The system includes an electronic control connected to at least one anti-trauma device and the at least one anti-explosion apparatus for controlling the timing and need of use of one or more of the anti-trauma device and the anti-explosion apparatus as part of extreme crash conditions of the craft to protect the volume and the inhabitants therein.

As explained above, the anti-trauma device as part of the system may include an outer hollow cylindrical body connected at one end to a cap and at the other end to an exhaust with a cylindrical valve and cap with a body for moving from a low position to a high position by a fraction of an inch having a series of lateral holes for releasing a solution inside the hollow body, the hollow body mounted to a wall of a volume for holding passengers, a cylindrical membrane inside the hollowed body for defining a first cavity between the membrane and the exhaust for holding a liquid, and a second cavity between the membrane and the cap for holding a pressurized gas, and a quickly expanding chemical solution in the first cavity, and a detonator for expanding a gas found in the second cavity, wherein the quickly expanding chemical solution is a force absorbing compound with quick release capacities.

The anti-explosion apparatus as part of the system includes an outer hollow cylindrical body connected at both ends with a cap, a central ring with a valve system equipped with two diaphragms, the valve system enclosed in the outer hollow cylindrical body for defining between the diaphragms and the two caps lateral zones for the storage of chemical solutions, and wherein inside the valve system past the diaphragms is a mixing zone of the product, a pair of deformable membranes each within the lateral zones for the storage of chemical solutions to further designed gas area for rapid expansion of the gas, and a pneumatic system for the entry of pressurized compressible fluid via a series of tubes to the gas areas using nozzles.

Figure 3:
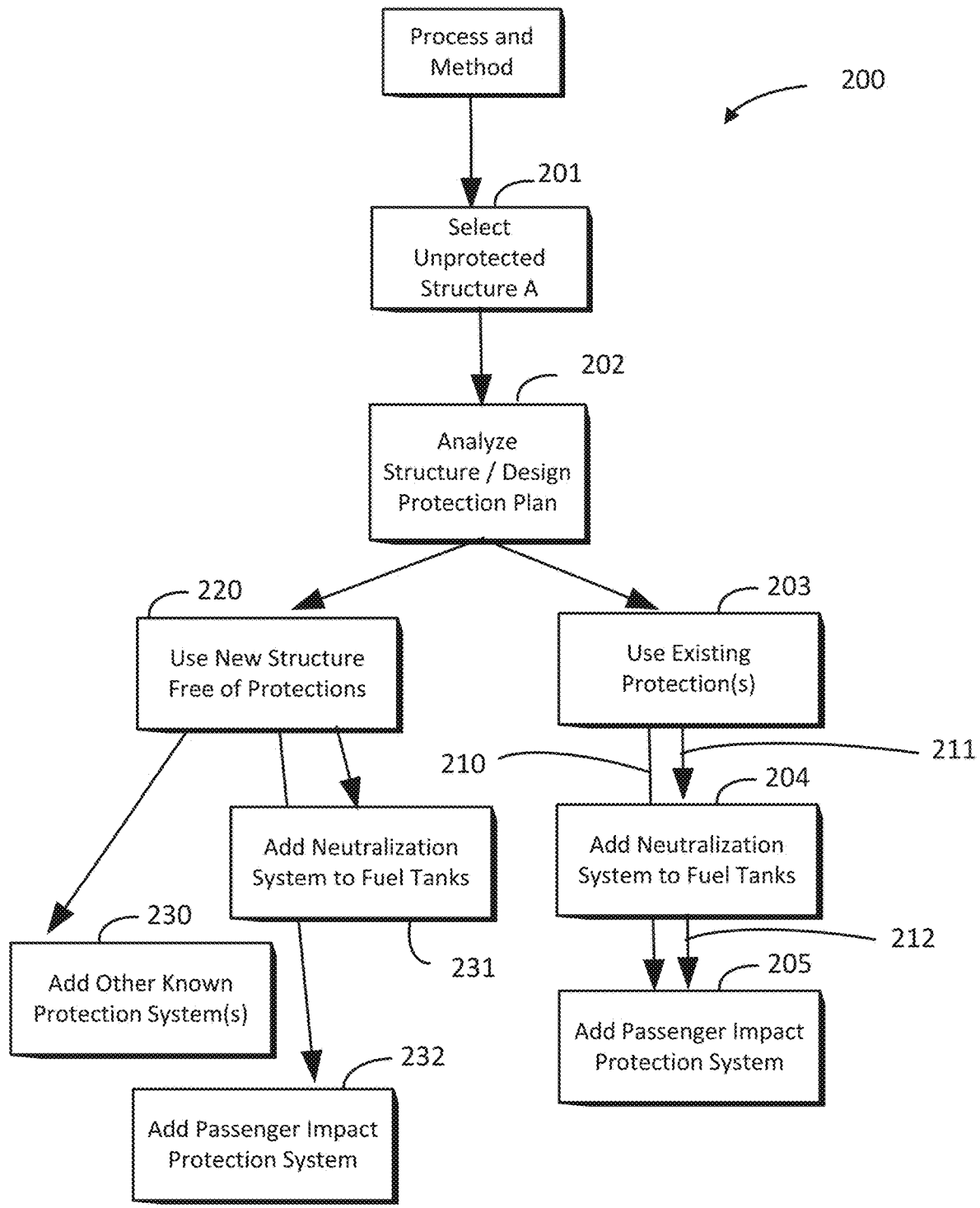
FIG. 3 illustrates using a block diagram with sample steps linked with the installation or the retrofitting of the system for protecting inhabitants in a volume shown illustratively at FIG. 2.
Figure 4:
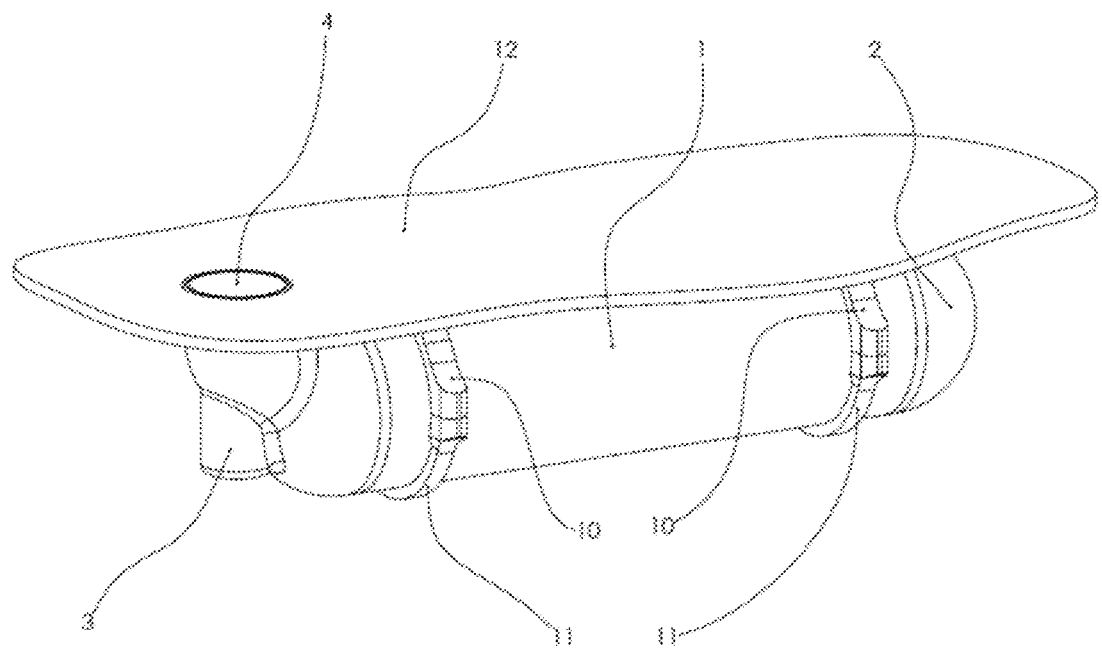
FIG. 4 is a first three dimensional illustration of the anti-trauma apparatus mounted to the outside surface of a passenger compartment according to an embodiment of the present invention.
Figure 5:
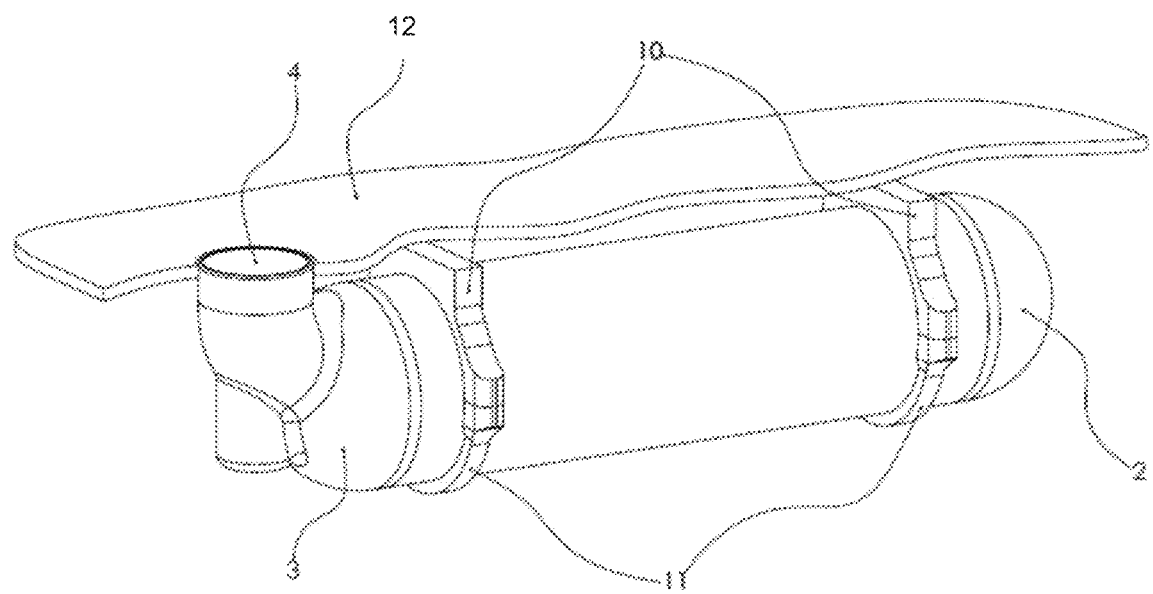
FIG. 5 is the apparatus shown at FIG. 4 where half of the outside surface passenger compartment has been removed in part from the view to aid with comprehension.
Figure 6:
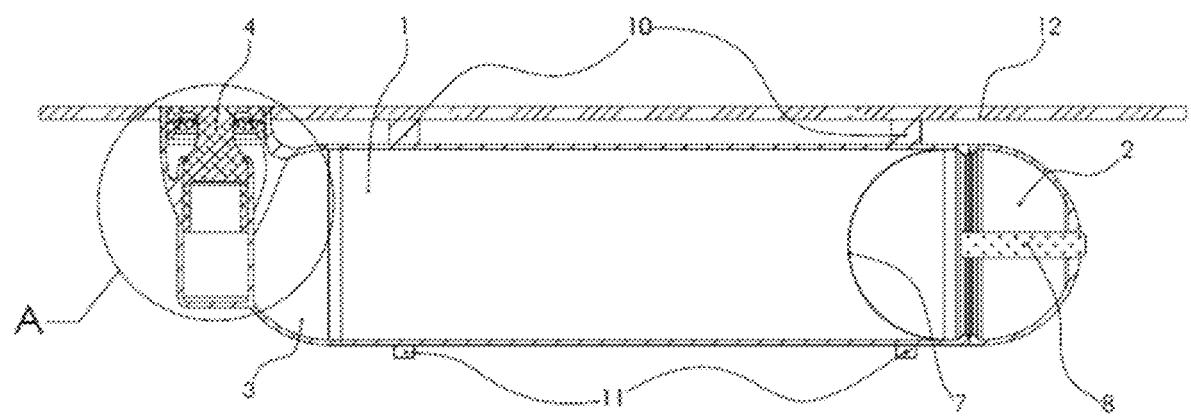
FIG. 6 is a side elevation cut view along the middle of a first embodiment of the anti-trauma apparatus shown in FIG. 4.
Figure 7:
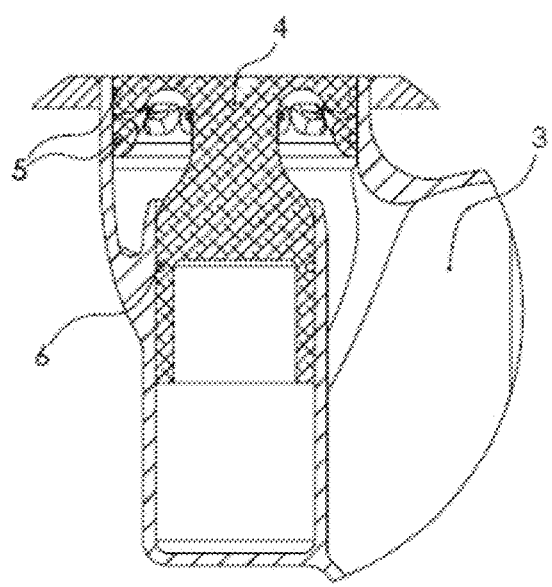
FIG. 7 is a close-up view of the detail illustrated as A on FIG. 6.

What is also shown is method of retrofitting a craft 200 as shown at FIG. 3, with a system for the protection of inhabitants in a volume of the craft as shown at FIG. 2, the method comprising the steps of selecting a craft 201, analyzing the structure and forming a design plan 202, deciding 220, 203 if old safety protection of the craft must be disabled or if they must be used in tandem with additional protections, and in the event old safety protections must be disabled 220, adding one of (a) an anti-trauma device 231, (b) an anti-explosion apparatus 232, or (c) another known system 230. In the event existing protections 203 are used, the step of adding one or more of an anti-trauma device 205, and anti-explosion apparatus 204 as part of the system for the protection of inhabitants in the volume of the craft. As illustrated as 211, 212 on FIG. 3, these steps may be added together or only one.

Process and Method for the Protection of Inhabitants

As shown above, what is described in order is the general use of the technology and some information that describes it generally and broadly. Then, the different pieces are explained with greater precision, such as the anti-trauma device(s) and its compounds, and the anti-explosion apparatus with its own compound. Next is explained how pieces alone are new and useful and are valuable improvements over the known art both structurally, functionally, and as a matter of concept of use. Then, what is explained is how these two pieces may be both used as part of a new system of protection and the associated methods of use thereof. We also note above that this system may be implemented on existing or new crafts as part of a new process and method for the implementation and retrofitting of existing crafts.

What is now described is the process of use of this protective technology to save lives and help structure be protected/inerted in case of crashes or other accidental conditions. For example, a process for the protection of inhabitants of a volume of a craft using a system is shown comprising the steps of adding to a craft a system for the protection of inhabitants comprising at least an anti-trauma device for mounting to a volume of a craft for holding passengers, and at least an anti-explosion apparatus for the protection of inhabitants in the volume of a craft, using an electronic or sensor-based system to diagnose craft environmental situations where protection of inhabitants of a volume the craft are needed, enabling a blast-release of a neutralizing chemical compound within the anti-explosion apparatus for release of a first neutralizing chemical into the fuel tank reservoir in a craft to neutralize the inflammability and explosion capacity of the fuel in the tank to avoid detonations and damage to an adjacent volume, and enabling a blast release of a second chemical within at least one anti-trauma device to protect the inhabitants of the volume.

Also described is how the process provides for precisely timing the blast release of both of the chemicals in the anti-trauma and the anti-explosion devices to optimize protection during a crash landing wherein the blast release of the anti-explosion chemical to neutralize the fuel is conducted before landing and the release of the anti-trauma chemical is done seconds before impact on the ground.

Finally, along the same line a method of protection of inhabitants in a volume of the craft, the method comprises the steps of adding to a craft a system for the protection of inhabitants comprising at least an anti-trauma device for mounting to a volume of a craft for holding passengers, and at least an anti-explosion apparatus for the protection of inhabitants in the volume of a craft, using an electronic or sensor-based system to diagnose craft environmental situations where protection of inhabitants of a volume the craft are needed, enabling a blast-release of a neutralizing chemical compound within the anti-explosion apparatus for release of a first neutralizing chemical into the fuel tank reservoir in a craft to neutralize the inflammability and explosion capacity of the fuel in the tank to avoid detonations and damage to an adjacent volume, and enabling a blast release of a second chemical within the at least one anti-trauma device to protect the inhabitants of the volume.

What is claimed is:

1. An anti-trauma device for mounting to a volume for holding passengers, including:
    an outer hollow cylindrical body connected at one end to a cap and at the other end to an exhaust with a cylindrical valve and cap with a body for moving from a low position to a high position by a fraction of an inch having a series of lateral holes for releasing an expanding chemical solution from inside the hollow body, the hollow body mounted to a wall of a volume for holding passengers;
    a cylindrical membrane inside the hollow body for defining a first cavity between the membrane and the exhaust for holding the expanding chemical solution, and a second cavity between the membrane and the cap for holding a pressurized gas; and
    a detonator for expanding the pressurized gas found in the second cavity, wherein the expanding chemical solution is a force absorbing compound with quick release capacities.

2. The anti-trauma device of claim 1, wherein the outer hollow body is a cylinder, the end cap a semi-spherical ball and the membrane is elastic.

3. The anti-trauma device of claim 2, wherein the cylinder, end cap, and the exhaust are made of a non-corrosive alloy.

4. The anti-trauma device of claim 3, wherein the alloy is a composite material.

5. The anti-trauma device of claim 1, wherein the cylindrical valve is a spray valve hermetically mounted in the exhaust body with a guide, a limiter, a positioning sensor and a sealing contact surface.

6. The anti-trauma device of claim 1, wherein the inside surface of the hollow body has an inside surface polished with low roughness for the better release of the liquid via the exhaust.

7. A method of filling a volume for holding a fixed number of passengers with a chemical solution using a plurality of anti-trauma devices, the method comprising the steps of:
    counting the number of passengers designed for protection within the volume for holding the fixed number of passengers;
    applying an algorithm to determine from the number of passengers a needed number of anti-trauma devices; and
    attaching to the outside surface of the volume for holding the fixed number of passengers the needed number of anti-trauma devices, each made of:
        an outer hollow cylindrical body connected at one end to a cap and at the other end to an exhaust with a cylindrical valve and cap with a body for moving from a low position to a high position by a fraction of an inch having a series of lateral holes for releasing the chemical solution from inside the hollow body, the hollow body mounted to a wall of the volume for holding passengers;
        a cylindrical membrane inside the hollow body for defining a first cavity between the membrane and the exhaust for holding the chemical solution, and a second cavity between the membrane and the cap for holding a pressurized gas; and
        a detonator for expanding the pressurized gas found in the second cavity, wherein the chemical solution is a force absorbing compound with quick release capacities.

8. The method of claim 7, wherein the outer hollow body of each anti-trauma device is a cylinder, the end cap a semi-spherical ball and the membrane is elastic.

9. The method of claim 8, wherein the cylinder, end cap, and the exhaust are made of a non-corrosive alloy.

10. The method of claim 9, wherein the alloy is a composite material.

11. The method of claim 10, wherein the cylindrical valve is a spray valve hermetically mounted in the exhaust body with a guide, a limiter, a positioning sensor and a sealing contact surface, and wherein the spray valve is mounted between adjacent seats in the volume.

12. The method of claim 11, wherein the inside surface of the hollow body has an inside surface polished with low roughness for the better release of the liquid via the exhaust.

* * * * *